United States Patent [19]
Frunzetti

[11] Patent Number: 6,065,682
[45] Date of Patent: May 23, 2000

[54] THERMOSTATIC VALVE

[75] Inventor: Barbu-Scarlat Frunzetti, Kornwestheim, Germany

[73] Assignee: Behr Thermot- tronik GmbH & Co., Germany

[21] Appl. No.: 09/281,541

[22] Filed: Mar. 30, 1999

[30] Foreign Application Priority Data

Mar. 31, 1998 [DE] Germany ............................ 198 14 252

[51] Int. Cl.[7] .................................................. G05D 23/13
[52] U.S. Cl. ............... 236/12.15; 236/93 A; 236/DIG. 2
[58] Field of Search .................. 236/12.15, 34, 236/34.5, 100, 93 A, DIG. 2

[56] References Cited

U.S. PATENT DOCUMENTS

| | | |
|---|---|---|
| 2,503,901 | 4/1950 | Chace .................................. 236/12.15 |
| 3,768,731 | 10/1973 | Lavado .................................. 236/34.5 |
| 3,907,199 | 9/1975 | Kreger .................................. 236/34.5 |
| 4,155,504 | 5/1979 | Caldwell ................................. 236/100 |
| 4,165,034 | 8/1979 | Rogers, Jr. et al. ...................... 137/75 |
| 4,606,302 | 8/1986 | Huemer et al. ......................... 236/34.5 |
| 4,883,082 | 11/1989 | Pirkle ..................................... 236/100 |

*Primary Examiner*—William E. Tapolcal
*Attorney, Agent, or Firm*—Kennedy Covington Lobdell & Hickman, LLP

[57] ABSTRACT

In connection with a thermostatic valve, in particular for regulating a coolant supply to a transmission fluid cooler, two valves are provided, which are respectively adjustable by means of thermostatic operating elements. Two thermostatic operating elements are associated with a valve and engage a valve element, which is adjustable for opening a second valve, in the same direction.

7 Claims, 2 Drawing Sheets

THERMOSTATIC VALVE

FIELD OF THE INVENTION

The invention relates to a thermostatic valve, in particular for regulating a coolant supply to a transmission fluid cooler, having a first valve, which is adjustable by means of a thermostatic operating element and regulates the supply of cooled coolant to a mixing chamber, and having a second valve, which is adjustable by means of a thermostatic operating element and regulates the supply of heated coolant to the mixing chamber.

BACKGROUND OF THE INVENTION

A thermostatic valve of the type mentioned above has, on the one hand, the function of shortening the warm-up phase of an internal combustion engine after a cold start, i.e. to reach the operating temperature of, for example, a transmission fluid cooler for an automatic transmission. On the other hand it has the function to assure that a relatively high operating temperature is maintained and a maximally permissible temperature is not exceeded. The valve, which regulates the supply of the heated coolant to the mixing chamber, only opens when the coolant of the internal combustion engine has reached a minimum temperature on the order of 80° C., for example. The valve regulating the supply of the cold or cooled coolant only opens when the operating temperature on the order of 110° C. to 120° C. has been reached. The thermostatic operating elements employed in the process have reached a high standard of quality today. However, it is still not possible to absolutely assure that the thermostatic valves will not fail. In this case the problem arises that both valves then remain closed, so that cooling is prevented and the transmission fluid cooler, for example, does not operate and therefore overheating in the area of the automatic transmission can occur.

OBJECT AND SUMMARY OF THE INVENTION

It is the object of the invention to design a thermostatic valve of the type mentioned at the outset in such a way that its dependability against failure is further increased.

This object is attained in that two thermostatic operating elements are assigned to the second valve, which engage a valve element, which is adjustable for opening the second valve, in the same direction.

The additional thermostatic operating element significantly increases the safety from a functional failure, since in actual use it can be considered to be almost impossible for all thermostatic operating elements to fail. Moreover, the use of a second thermostatic operating element for the valve regulating the supply of heated coolant results in a functional advantage. It is therefore possible to design this valve in such a way that it remains completely closed up to a preselected minimum temperature. This design has the advantage over another solution, wherein a bypass flow is provided for this valve. For this bypass flow it is necessary to provide a flow cross section which assures that this bypass flow is sufficient to make sure that a permissible maximum temperature is not exceeded in case of an outage of the thermostatic valve. However, such a solution is particularly disadvantageous for Diesel engines with direct fuel injection, since the latter generate only relatively little heat. In this case there is the danger that at cold outside temperatures the bypass flow is so strong that the operating temperature is not reached at all.

It is provided in an embodiment of the invention for the two thermostatic operating elements of the second valve to be arranged coaxially one behind the other. This arrangement permits a spatially advantageous structure and simple transfer elements.

In an advantageous further development it is provided that the second valve contains a valve disk, which is loaded with a closing spring and which in the opening direction is in slaved connection with both thermostatic operating elements. Thus, each one of the two thermostatic operating elements causes the opening of this valve when the appropriate coolant temperature has been reached.

In a further embodiment of the invention it is provided that the two thermostatic operating elements are arranged mirror-symmetrically transversely to a longitudinal axis. This permits the employment of thermostatic operating elements, which are designed identical to a large degree for this second valve.

A common housing for the two thermostatic operating elements is provided in a further embodiment of the invention, which, by means of a transverse wall, is divided into two chambers, each of which is assigned to a thermostatic operating element. This results in a simple construction.

Further characteristics and advantages of the invention ensue from the following description of the exemplary embodiments represented in the drawings, and from the dependent claims.

DETAILED DESCRIPTION OF THE PREFERRED EMBODIMENTS

Figure 1:
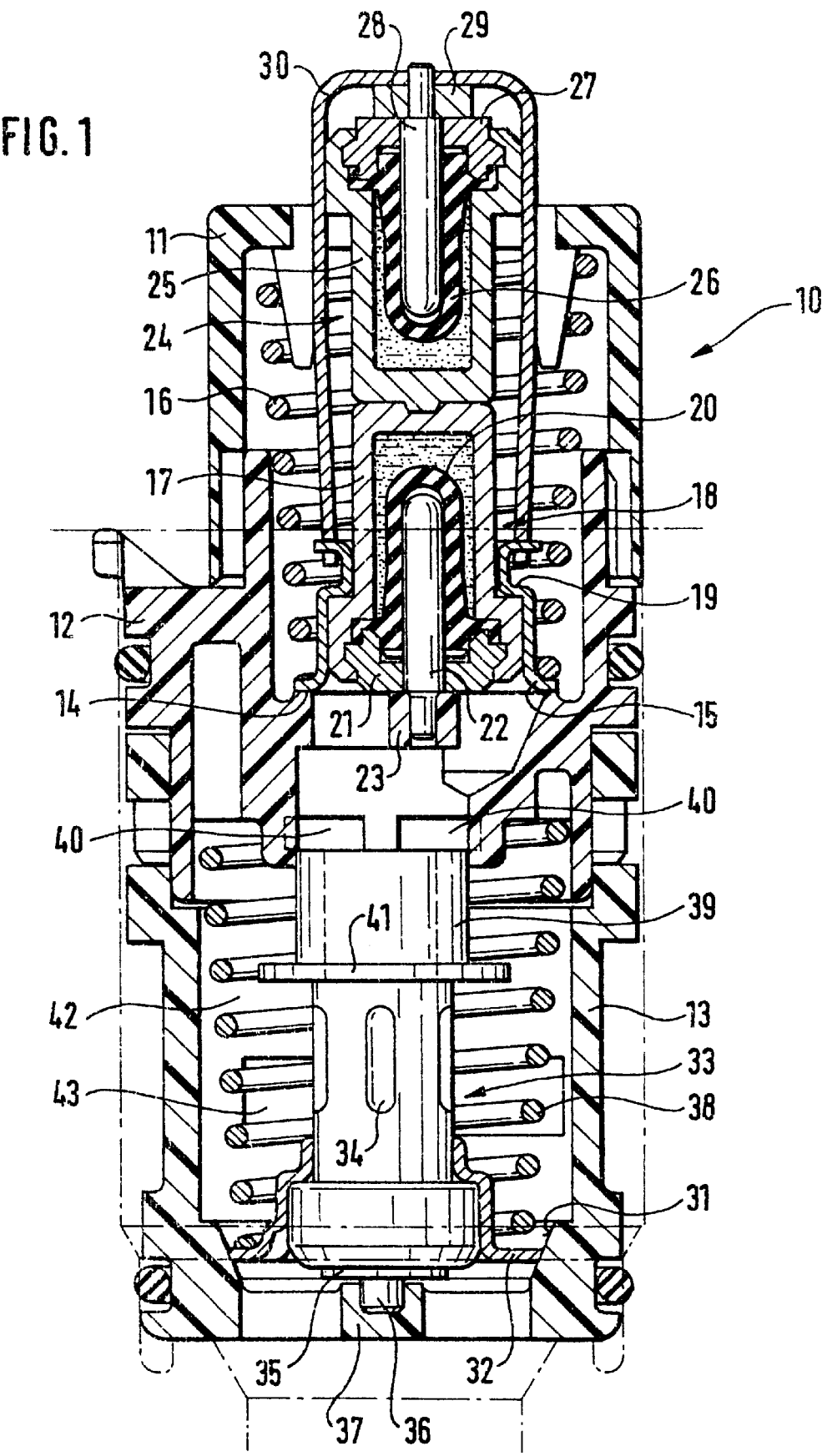
FIG. 1 represents an axial section through a first embodiment of a thermostatic valve in accordance with the invention.

The thermostatic valve 10 represented in FIG. 1 is designed as a preassembled, cartridge-like insert, which is installed in the assembled state. The thermostatic valve has a valve housing which has been put together from the plastic elements 11, 12, 13. The element 12 constitutes a valve seat 14, to which a valve disk 15 is assigned. The valve disk 15 is pressed against the valve seat 14 by means of a closing spring 16, which is supported on the element 11 of the valve housing. The valve disk 15 is slidingly guided on a housing 17 of a first thermostatic operating element 18. The housing 17 is formed with an annular outwardly facing shoulder and the valve disk 15 is formed with an annular inwardly facing shoulder 19 that seats on the housing shoulder.

An expandable material, in particular a wax mixture, is disposed in the interior of the housing 17 of the thermostatic operating element 18. The space filled with the expandable material is sealed to the exterior by means of a sack-shaped diaphragm 20, which is secured by being crimped between a guide element 21 and an overhang of the housing 17. A work piston 22 is guided in the guide element 21 and projects into the sack-shaped diaphragm 20, and therefore into the interior of the housing 17. The work piston 22 is supported on a strip 23 of the valve housing element 12.

A second thermostatic operating element 24, which is designed identical to a large extent with the first thermostatic operating element 18 and is arranged mirror-symmetrically transversely to the longitudinal axis, is also associated with the valve formed by the valve seat 14 and the valve disk 15. The second thermostatic operating element 24 has a housing 25 filled with an expandable material and is sealed to the exterior by means of a sack-shaped diaphragm 26. The diaphragm 26 is held by means of a guide element 27 crimped into the housing 25 with the edge of the diaphragm therebetween. A work piston 28, which enters the sack-shaped diaphragm 26 is guided in the guide element 27. An intermediate ring 29, which acts on a hoop 30, whose two legs are connected with the valve disk 15, rests against a shoulder of the work piston 28.

The thermostatic valve 10 contains a further valve formed by a valve seat 31 of the housing element 13 and a valve disk 32. The valve disk 32 has been pressed on a housing 34 of a further thermostatic operating element 33. The thermostatic operating element 33 is designed to correspond to the thermostatic operating elements 18 and 24, i.e. it contains an expandable material and a sack-shaped diaphragm, secured by means of a crimped guide element 35, as well as a work piston 36. The work piston 36 is supported on a strip 37 of the housing element 13. The valve disk 32 is loaded by a pre-stressed closing spring 38, which bears against the housing element 12.

A valve slide 39 which, together with openings 40 in the valve housing element 12 constitutes a sliding valve, is pressed on the opposite end of the housing 34 of the thermostatic operating element 33. An intermediate annular rebound strip 41, which is located in the area of the mixing chamber 42, is provided on the valve slide 39. The mixing chamber 42 is formed with an opening in the element 13 of the valve housing, which is connected with a conduit leading to a transmission fluid cooler, not represented.

The valve constituted by the valve seat 14 and the valve disk 15 regulates the inflow of a heated coolant which, bypassing a coolant cooler, flows from the engine outlet to this valve and therefore to the thermostatic operating elements 18, 24. The valve constituted by the valve seat 31 and the valve disk 32 regulates the inflow of a cooled coolant coming from a coolant cooler, not represented.

Up to a predeterminable minimum temperature of, for example 80° C., the thermostatic valve 10 blocks any coolant flow to the associated fluid cooler, not shown. After reaching this minimum temperature, the valve constituted by the valve seat 14 and the valve disk 15 opens. The two thermostatic operating elements 18, 24 associated with this valve can be set to operate at the same opening temperature. However, it can also be provided that, for example, the thermostatic operating element 24 is set to a higher opening temperature, for example an opening temperature which is higher on an order of 10%. When the minimum temperature has been reached, the valve constituted by the valve seat 14 and the valve disk 15 opens, so that the heated coolant, which comes from the engine outlet and bypasses a coolant cooler, flows in. The coolant flows through the openings 40 into the mixing chamber 42, and from there through the opening 43 to the transmission fluid cooler, so that the latter is heated.

The valve constituted by the valve seat 31 and the valve disk 32 remains closed until the range of the desired operating temperature has been reached. To this end, the expandable material contained in the thermostatic operating element 33 is designed for a corresponding opening temperature. If the valve constituted by the valve seat 31 and the valve disk 32 is opened, cold coolant coming from the coolant cooler flows into the mixing chamber 42 and is mixed there with the heated coolant coming directly from the engine outlet. This coolant, which has a mixed temperature, then flows through the opening 43 into the transmission fluid cooler. The mixing temperature is regulated to a predeterminable temperature by means of the amount of coolant flowing from the coolant cooler and the amount of coolant coming directly from the engine outlet and flowing via the sliding valve 39, 40 into the mixing chamber. In this temperature range the valve constituted by the valve seat 14 and the valve disk 15 is fully open, so that the regulation takes place by means of the thermostatic operating element 33 and the valves 31, 32 and 39, 40, which it adjusts.

If the thermostatic operating element 43 should fail, the closing spring 38 keeps the valve constituted by the valve seat 31 and the valve disk 32 closed, so that the flow of cooled coolant is blocked. In this case only heated coolant flows into the mixing chamber 42 wherein, however, this heated coolant only has a temperature which is sufficient to cool the transmission fluid of an automatic transmission by means of the transmission fluid cooler to such an extent, that a maximally permissible temperature of, for example 130° C., is not exceeded. The function remains as long as at least one of the two thermostatic operating elements does not fail. A critical situation is extremely implausible, since overheating could only occur if all three thermostatic operating elements 18, 24, 33 would fail.

Figure 2:
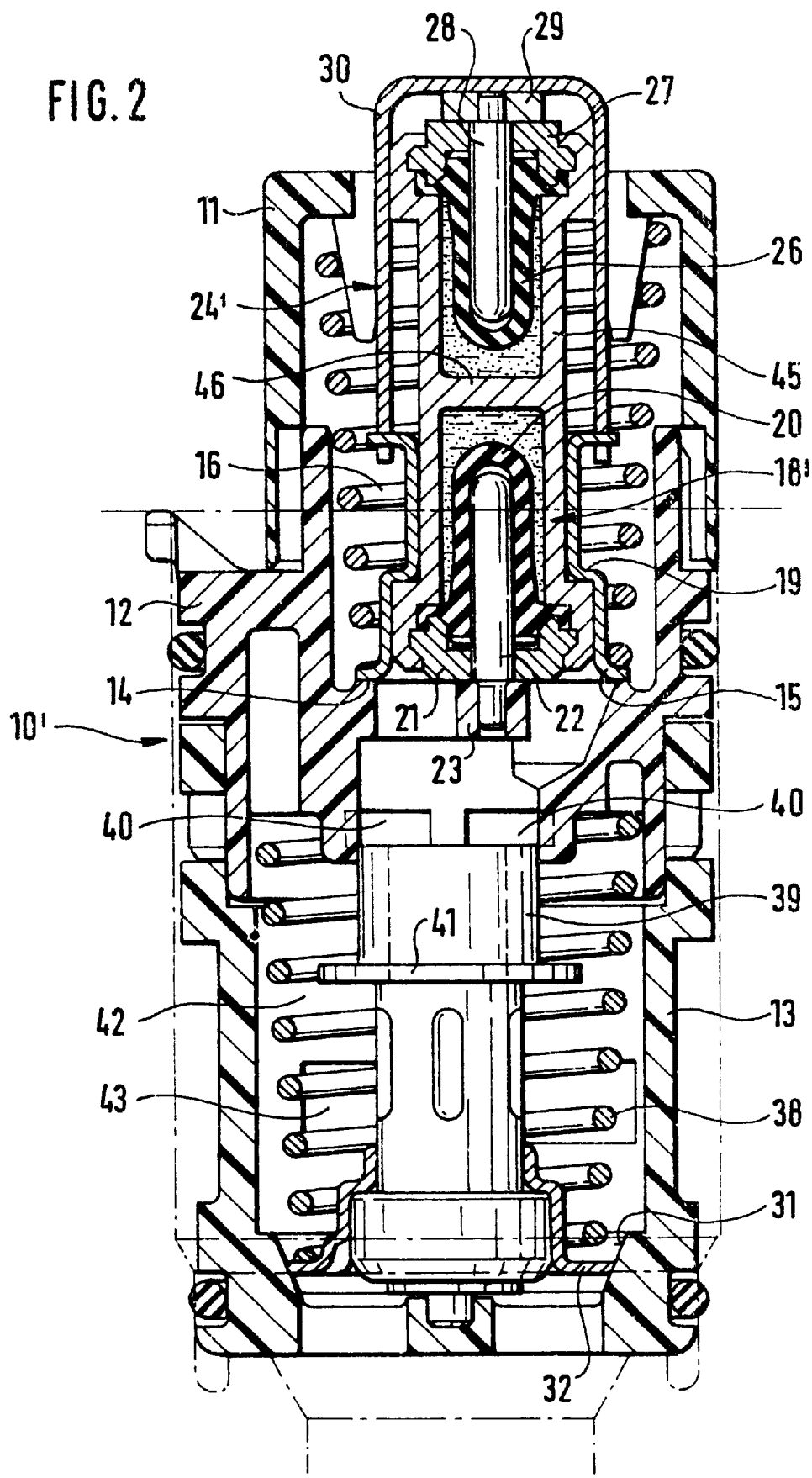
FIG. 2 is an axial section through a modified embodiment.

The thermostatic valve represented in FIG. 2 corresponds in its basic structure and function to the thermostatic valve in FIG. 1, so that reference is made to the description of the latter and the same reference numerals are employed. There is only a difference in respect to the embodiment of the thermostatic operating elements 18' and 24', which are associated with the valve constituted by the valve seat 14 and the valve disk 15. The two thermostatic operating elements 18', 24' have a common housing 45, which is divided into two chambers by means of a transverse wall 46, so that two separate thermostatic operating elements are placed into the common housing 45. Except for this difference regarding the housing 45, the remaining structure of the thermostatic operating elements 18' and 24' is identical.

In connection with this modified embodiment, which in its structure essentially corresponds to the primary embodiment in accordance with FIG. 1, it is provided that the thermostatic operating element 24 is turned by 180° around a horizontal axis. In this case the work piston 28 is supported on the bottom of the housing 17, while the housing 25 then rests against the transverse strip of the hoop 30.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims.

What is claimed is:

1. A thermostatic valve for regulating a coolant supply to a transmission fluid cooler, having a first valve, which is adjustable by means of a thermostatic operating element and regulates the supply of cooled coolant to a mixing chamber, and having a second valve, which is adjustable by means of a thermostatic operating element and regulates the supply of heated coolant to the mixing chamber, said second valve comprising:

two thermostatic operating elements engaging a valve element and being operable to adjust the opening of the second valve, in the same direction.

2. The thermostatic valve in accordance with claim 1, characterized in that the two thermostatic operating elements of the second valve are arranged coaxially.

3. The thermostatic valve in accordance with claim 1, characterized in that the second valve contains a valve disk, which is loaded with a closing spring and which in the opening direction is in slaved connection with both of said two thermostatic operating elements.

4. The thermostatic valve in accordance with claim 3, characterized in that said valve disk is slidingly guided on a housing of one of said two thermostatic operating elements and extends with a shoulder seating on a shoulder of said housing, and a hoop is attached to the valve disk and is engaged by the second of said two thermostatic operating elements.

5. The thermostatic valve in accordance with claim 1, characterized in that said two thermostatic operating elements are arranged mirror-symmetrically transversely to a longitudinal axis.

6. The thermostatic valve in accordance with claim 2, characterized in that said two thermostatic operating elements are supported in housings that have bottoms resting against each other.

7. The thermostatic valve in accordance with claim 1 characterized in that said two thermostatic operating elements are mounted in a common housing that is divided into two chambers by a transverse wall therebetween, each thermostatic operating element being disposed in one of said chambers.

* * * * *